United States Patent [19]
Curley et al.

[11] 3,934,232
[45] Jan. 20, 1976

[54] INTERPROCESSOR COMMUNICATION APPARATUS FOR A DATA PROCESSING SYSTEM

[75] Inventors: John L. Curley, Sudbury; Roger R. Richard, Chelmsford, both of Mass.

[73] Assignee: Honeywell Information Systems, Inc., Phoenix, Ariz.

[22] Filed: Apr. 25, 1974

[21] Appl. No.: 463,946

[52] U.S. Cl. .......................... 340/172.5; 340/172.5
[51] Int. Cl.² .......................................... G06F 9/18
[58] Field of Search ................................ 340/172.5

[56] References Cited
UNITED STATES PATENTS

| | | | |
|---|---|---|---|
| 3,406,380 | 10/1968 | Bradley et al. | 340/172.5 |
| 3,593,300 | 7/1971 | Driscoll, Jr. | 340/172.5 |
| 3,611,306 | 10/1971 | Reigel et al. | 340/172.5 |
| 3,648,252 | 3/1972 | Thron et al. | 340/172.5 |
| 3,654,617 | 4/1972 | Irwin | 340/172.5 |
| 3,676,860 | 7/1972 | Collier et al. | 340/172.5 |
| 3,702,462 | 11/1972 | England | 340/172.5 |
| 3,787,816 | 1/1974 | Hauck et al. | 340/172.5 |
| 3,812,463 | 5/1974 | Lahti et al. | 340/172.5 |
| 3,821,709 | 6/1974 | Curley et al. | 340/172.5 |

Primary Examiner—Gareth D. Shaw
Assistant Examiner—John P. Vandenburg
Attorney, Agent, or Firm—R. T. Reiling; D. A. Frank

[57] ABSTRACT

In a data processing system having independently operating asynchronous processors, apparatus is disclosed which provides for interprocessor synchronization and/or information exchange. Synchronization interlocks and controls are provided for both identifying shared resources of a control processor and an input-/output controller (IOC) processor and for obtaining control over these shared resources. If a conflict situation for any one of the shared resources arises, apparatus is disclosed whereby the IOC processor is provided the capability of assuming control over the shared resource even though the central processor has control over it. One of the shared resources is an interprocessor communication register which allows communication of control information between both the central processor and the IOC processor and from the central processor to the peripheral processor over a shared bus.

8 Claims, 5 Drawing Figures

Fig. 2.

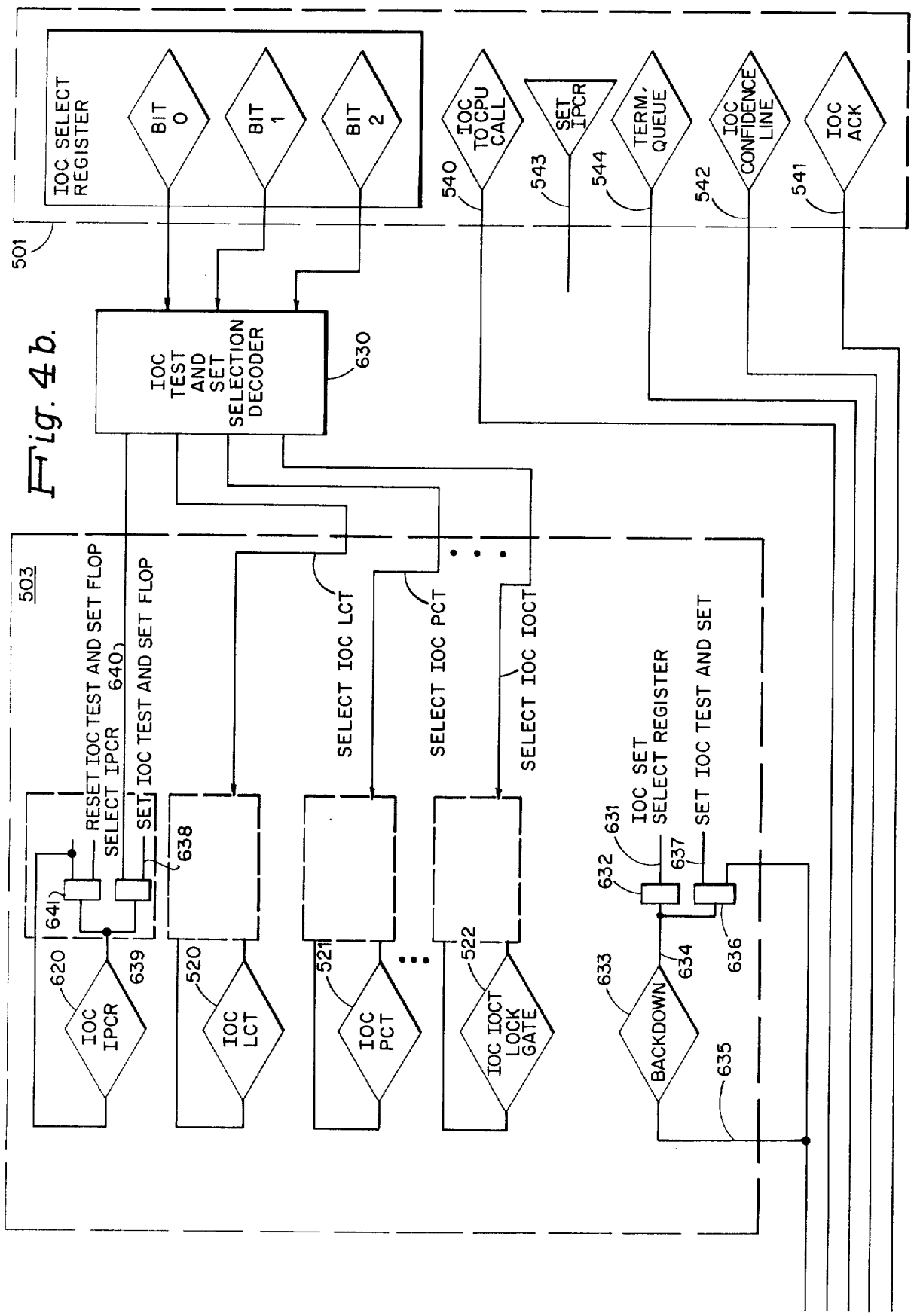

INTERPROCESSOR COMMUNICATION APPARATUS FOR A DATA PROCESSING SYSTEM

BACKGROUND OF THE INVENTION

A. Field of the Invention

This invention relates generally to data processing systems and more particularly to apparatus for enabling synchronization and information exchanges between independent asynchronous processors.

B. The Description of the Prior Art

As the complexity of modern data processing units has increased, more control functions formerly carried out by the central processing unit (CPU) subsystem are being delegated to other subsystems or processing units. For example, it is now common for an input/output controller (IOC) subsystem to have its own control store for carrying out its required control functions. In like manner, peripheral processors are now being designed with their own control store units. While each control apparatus provides the means for controlling the manipulation of its own processor, it may also provide the means for controlling manipulations which occur within another processor.

In the past, since these control apparatus and processing units were able to operate independently, adequate synchronization of operations was required. Further, much time was required for identifying and obtaining control information within the purview of the other processing unit. More specifically, in the past, the communication facilities for interprocessor communication would be utilized after one of the processors stored the information and then by a stimulus-response communication interchange indicated to the other processor the information's location. The other processor would then locate the information and retrieve it. In the situation wherein the central processing subsystem was involved, then main memory would be used to store the control information.

Alternatively, control information may be provided by software communication between the processing units. Not only does this slow overall operations of each processor, but in addition, it ties up main memory to a significant extent. Furthermore, the software is transmitted across the standard peripheral interface bus and as a result the speed of the actual data transfer is reduced. In view of the timing, synchronization and storage problems, it would be desirable to have a separate facility for directly transferring control information such that the time lags involved in interprocessor exchanges would be reduced.

OBJECTS OF THE INVENTION

It is, therefore, an object of the present invention to provide an improved data processing system.

It is a further object of the present invention to provide for improved synchronization and communication apparatus in a data processing system.

It is a still further object of the present invention to provide two processing units with associated control apparatus for improved synchronization and communication interchange in a data processing system.

It is another object of the present invention to provide apparatus in one of the processing units for controlling shared resources of each processing unit.

It is another more particular object of the present invention to prevent conflict situations arising from attempts to utilize shared resources when the other processing subsystem has gained access thereto.

SUMMARY OF THE INVENTION

The aforementioned and other objects of the present invention are accomplished in a data processing system by providing bistable indicating apparatus for identifying and controlling shared resources of independently operating asynchronous CPU and IOC processors. Control apparatus is provided in the IOC processor which is responsive to control signals from each processor for gaining access to the bistable indicating means, the control apparatus overcoming any conflict situation for utilizing the shared resources. One of the shared resources allows direct communication of control information between the CPU and IOC processors and one-way direct communication from the CPU processor to a peripheral processor.

BRIEF DESCRIPTION OF THE DRAWINGS

For a fuller understanding of the nature and objects of the invention, reference should be had to the following detailed description taken in conjunction with the accompanying drawings in which.

DESCRIPTION OF THE PREFERRED EMBODIMENT

Figure 1:
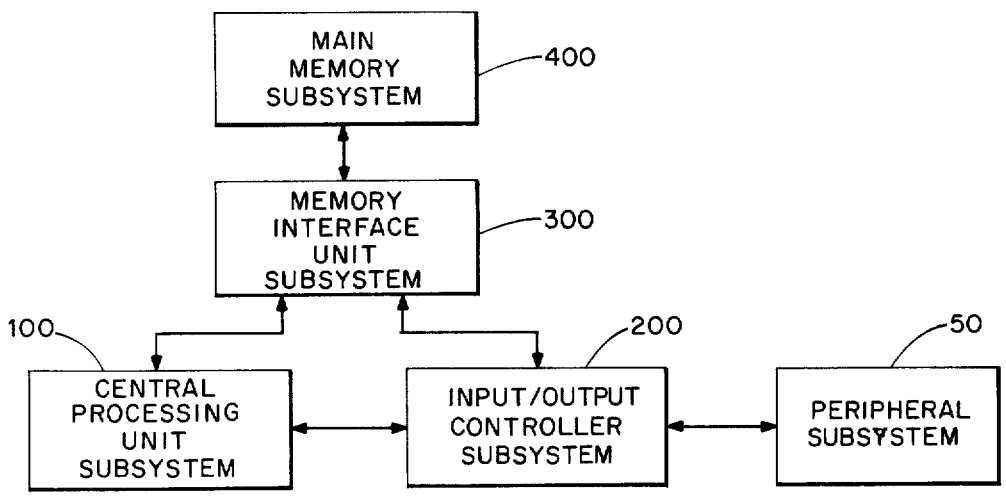
FIG. 1 is a block diagram of the principal subsystems of a data processing system.

Referring now to FIG. 1, a block diagram of the principal subsystems of the data processing system is shown. The peripheral subsystem 50 consists of peripheral units (such as printers, magnetic tape units, magnetic discs, etc.) which supply data to or receive data from the remainder of the data processing system. The input/output controller subsystem (IOC) 200 controls the transfer of data from the component peripheral units of the peripheral subsystem 50 to the data processing system. The main memory subsystem (MMS) 400 provides the apparatus for storage of data currently required for operation of the data processing system. The central processing unit subsystem (CPU) 100 contains the apparatus for implementing the major control and manipulative functions of the data processing system. The memory interface unit subsystem (MIU) 300 provides the apparatus for controlling the transfer of data between the MMS 400 and the CPU 100 or the IOC 200.

Figure 2:
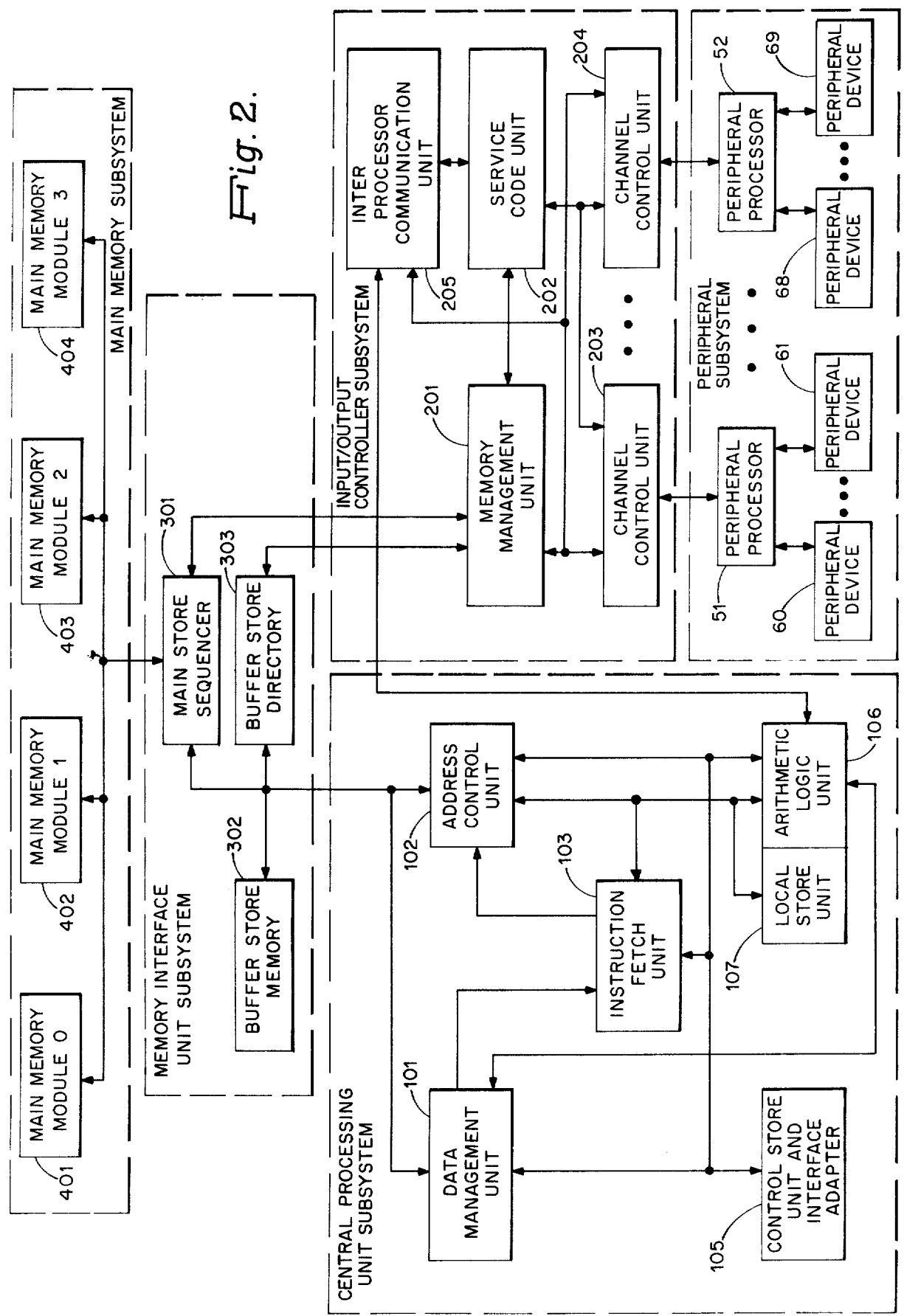
FIG. 2 is a block diagram of the major component circuits of the principal subsystems of a data processing system.

Referring next to FIG. 2, important component units of the subsystems of the data processing system are shown. The coupling between the various component units of the subsystem shown in FIG. 2 are representative and not comprehensive as will be apparent to one skilled in the art.

The main memory subsytem 400 is comprised of a group of four memory modules (401 to 404) in the preferred embodiment. These main memory modules may be operated in various modes such as an interleave mode. The main memory modules provide the apparatus for storage of the data necessary for the execution of the current processing tasks of the data processing system.

The CPU subsystem 100 is comprised of a data management unit 101, an instruction fetch unit 103, an address control unit 102, a local store unit 107, an arithmetic and logic unit 106, and a control store unit and interface adapter 105. The operations of the CPU are controlled by control store unit 105. The control store unit 105 is loaded, in the preferred embodiment, by a control store load unit external to the CPU 100. The control store unit contains an interface adapter which provides the logic necessary for directing the control store unit, such as address modification, address generation testing, etc. The arithmetic and logic unit 106 is comprised of the apparatus for performing the primary arithmetic operations and data manipulations required of the CPU. The local store unit 107 is comprised of a small memory and associated logic apparatus and is used to store CPU control information and as a temporary storage of operands and partial results during the data manipulation. The address control unit 102 includes apparatus for address development in the CPU. The instruction fetch unit 103 contains apparatus for keeping the CPU supplied with instructions and attempts to have the next instruction available before completion of the present instruction. The data management unit 101 provides an interface between the CPU and Buffer Store Directory 303 and/or buffer store memory 302. The apparatus of the data management unit 101 determines which portion of the data processing unit contains the information to be retrieved and transfers the information into the CPU at the proper time.

The memory interface unit 300 is comprised of a buffer store memory 302, a buffer store directory 303 and a main store sequencer 301. The buffer store memory 302 provides a small memory storage area for data that will receive a high percentage of usage in a given time. The buffer store directory 303 contains apparatus for establishing whether a given portion of data is contained in the buffer store memory 302. The main store sequencer 301 provides an interface between the module of the main memory subsystem and the IOC 200 or the CPU 100.

The IOC 200 is comprised of a memory management unit (MMU) 201, a service code unit (SCU) 202, a series of channel control units (CCU) of which two, channel control unit 203 and channel control unit 204, are shown, and an interprocessor communication unit (IPCU) 205. In the preferred embodiment, any number of channel control units up to 16 can be present. Each channel control unit provides an interface between the component peripheral units of the peripheral subsystem 50 and the memory management unit 201 and service code unit 202.

The service code unit 202 is effectively a control processor containing a control store and interface adapter logic for directing the control store unit. The service code unit services input/output (IO) requests to and from the CPU and also from the peripheral subsystem, decodes major operations, and initiates and terminates all operations on the peripheral interface bus (not shown) which is the standard channel adaptation. In addition, the service code unit handles all interprocessor communications between the IOC and CPU subsystems both for calls to the CPU and for answering requests from the CPU in either direction.

The memory management unit 201 controls the interface between each channel control unit 203, 204, and the service code unit 202 on a priority basis and directs the channel control unit and service control unit interface. The interprocessor communication unit 205 provides the synchronization and control information exchange facility between the asynchronously operating CPU and IOC subsystems. In addition to containing the control mechanisms for interprocessor communication, the IPCU provides for control information exchange from the CPU subsystem to the peripheral subsystem 50.

A peripheral subsystem 50 provides a transfer and control link for exchanging information between a series of peripheral processors of which two, peripheral processors 51 and 52, are shown and the IOC. The exchange is accomplished by controlling the logical states of various signal lines in accordance with pre-established rules implemented through a series of signals termed "dialogue." Each peripheral processor 51, 52, controls the operation of a plurality of peripheral devices by sending commands to the IOC. These commands are received in the channel control unit and sent to the service code unit for interpretation and execution.

Each peripheral processor, in the preferred embodiment, can contain up to 256 peripheral devices directly coupled thereto of which two are shown, peripheral devices 60, 61 and 68, 69, connected to each peripheral processor 51, 52 respectively. Any number of peripheral processors up to 16 can be present.

The IOC is thus capable of controlling a plurality of physical channels designated as CCU's 203, 204 which connect the IOC with one of a number of peripheral processors 51, 52. Each peripheral processor exchanges information with each of its associated peripheral devices over an interface according to a specific dialogue sequence.

Figure 3:
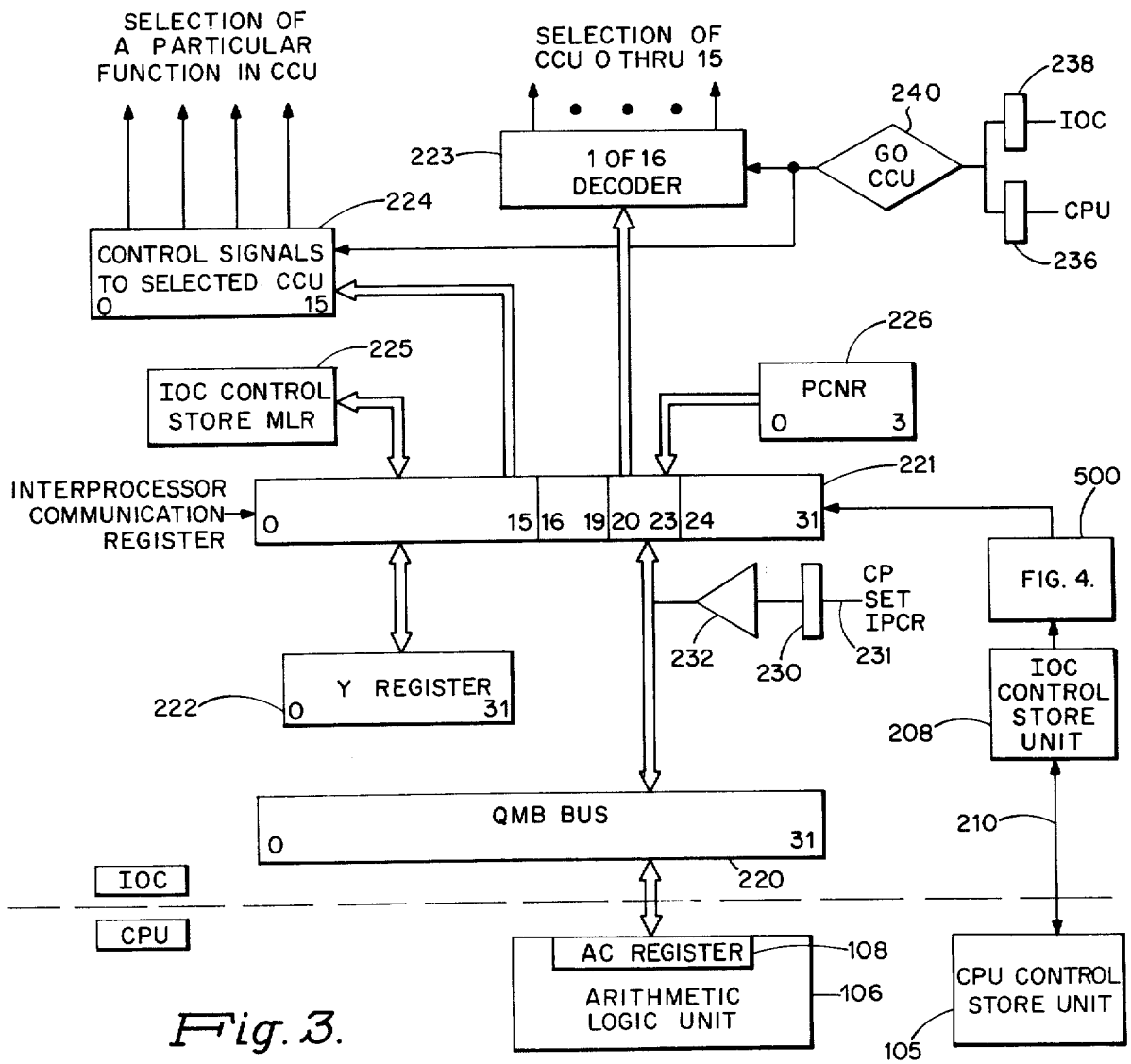
FIG. 3 is a block diagram showing the logic apparatus necessary for interprocessor communication between the CPU and IOC processors and from the CPU processor to the peripheral processor.

Referring next to FIG. 3, a block diagram is shown of the apparatus associated with IPCU 205 and used for exchange of control information both between the CPU 100 and IOC 200 subsystems and from the CPU 100 subsystem to the peripheral 50 subsystem.

The IPCU apparatus while residing in the IOC subsystem is coupled to apparatus in both the CPU 100 and the IOC 200.

While transfer of control information is being discussed, it is noted that other information exchanges may be occurring, either simultaneously or at periodic intervals. Thus, there may be a transfer of information from CPU 100 to main memory 400, a transfer of data from the peripheral subsystem via the CCU and MMU to the CPU, and a transfer of data from the SCU to main memory on behalf of the IOC. Thus, the control information exchange discussed herein is not only in addition to the above exchanges, but also is a direct parallel transfer of control information between at least two processing units. Moreover, by this parallel transfer overall efficiency is provided, which efficiency may be realized in some of the data transfers described supra.

In order to explain the operation of the IPCU 205, an example wherein the CPU is requesting information from the IOC is given. Initially, the CPU 100 would obtain control over the interprocessor communication register (IPCR) 221, by the apparatus shown in FIGS. 4 and 5. The IPCR is a shared resource of both the IOC and CPU subsystems and is used for storing control information to be delivered to the CPU, IOC or peripheral subsystems.

After control of the shared resource has been obtained, the CPU initiates a call, as is well known in the art, across control bus 210. This call is generated from the control store logic 105 of the CPU to the control store logic 208 of the service code unit 202. The control store logic 208 comprises apparatus for responding to control signals which may be provided by the CPU control logic or the memory portion of SCU 202 and for generating commands for manipulating apparatus in the IOC. In addition, requests from the CPU control store 105 can cause control store 208 to issue commands manipulating apparatus in the CPU.

Upon placing the call, the CPU, which has the control information stored in AC register 108 of arithmetic and logic unit 106, (for a further explanation of the arithmetic logic unit and the AC register, see Data Processing System Utilizing Data Field Descriptors For Processing Data Fields by Charles W. Bachman, Ser. No. 424,259, filed on Dec. 13, 1973, and assigned to the same assignee as the present invention) generates a strobe signal, set IPCR, via control store 105. This strobe signal is provided over line 231 and enables AND-gate 230 and amplifier 232. The signal from gate 230 and amplifier 232 controls the transfer of information into IPCR 221 from QMB bus 220, and hence the control information of the CPU in AC register 108 is now stored in IPCR 221. It should be noted that if the IPCR 221 shared resource was not obtained, then the control information may be placed in a savings area such as local store unit 107.

The control information in IPCR register 221 may be of two types. The control information may be a command to a unit, and as a result once executed, no further need of the resource is required. Alternatively, the control information may identify a request for information for which a response is required. The capability of synchronizing the multiple passes of control information is provided as will be seen by the test and set logic described in FIG. 4. In the request mode, the synchronization logic is not disabled, and as a result, successive transfers of information are possible.

Both the IOC and peripheral processors have a hierarchy of functions defined by various gates (not shown) within their configuration. The IPCR 221 is coupled to these gates and can control their state such that a particular function may be initiated. The control of these gates is provided by the control information stored in IPCR 221 which enables the logic associated with a particular function. For example, the control information may be a command to one of the peripheral processors to reset a particular channel. The reset function for the channel may be defined by a flip flop in a certain state. The control information provided from the IPCR would enable the flip flop to change its state. Moreover, for this particular example, the change in the flip flop would initiate an exchange over the standard channel adaptation from the peripheral processor to the IOC in order to execute the function. As a result, a change of control and communication is effectively provided by the control information provided through IPCR 221.

The format of information in the IPCR register 221 for communication from either the IOC or CPU to the CCU and peripheral subsystems may be such that the first eight bits provide the signals for identifying the control function to be performed. These signals may include "operation out," "instruction waiting," "reset channel," "channel program waiting," or "perform diagnostics," etc. Bits 20 to 23 may contain the physical channel number for identifying the particular channel of the peripheral subsystem and bits 24 to 31 may contain the logical channel number which identifies the peripheral device.

The IPCR register 221 format for CPU to IOC interprocessor communications is such that bits 13 to 15 may contain the reason for the call and bits 20 to 23 contain the physical channel number decoded by either register 223 of the IOC or the equivalent register in the CPU. In addition, depending upon the communication engaged in by the IOC and CPU, there are other bits which provide a response format based on the reason for the call and these bits may be contained in bit positions 16 to 23.

For control information to be transferred to the IOC, the operation would be as follows. Once the information resides within IPCR 221, the call from the CPU across control bus 210 enables an interrupt in the IOC such that the IOC may be required to determine the reason for the CPU call. This is accomplished by control store 208 enabling the transfer of information from IPCR register 221 to Y register 222 in service code unit 202. Control store 208 then interrogates bits in the Y register in order to determine the reason for the call from the CPU subsystem. After ascertaining the reason for the call, the IOC would then, if necessary, respond with the appropriate information required by the request from the CPU.

If the IOC desired to initiate a communication with the CPU or the peripheral subsystem via the CCU, the control information exchange would occur under the control of control store 208. Control store 208 would provide signals as is well known in the art which enable IOC control store MLR register 225 and physical channel number register (PCNR) 226 to transfer the control information to the Y register 222 or directly into IPCR 221. Register 225 is the local register of the control store unit 208 and provides the actual control information that the IOC is to transfer to the CPU or the peripheral subsystem via the CCU. PCNR 226 is a one of 16 encoder which identifies the particular channel to the CPU in order that the CPU can associate the control information provided by the IOC with the channel number of a particular peripheral component unit.

If the IOC is responding to a CPU call, the IOC, after having placed the control information in IPCR 221, then provides a control signal, IOC acknowledge, over the control lines 210 to the CPU which notifies the CPU that it may place the control information from the IPCR 221 on the QMB bus 220 and into its AC register 108. The CPU can then take this control information and examine the bits transferred from the IOC to the CPU to determine its required operations.

Thus, the operation of a CPU to IOC request for information would be as follows. Once the IOC identifies a request from the CPU, an interrupt is executed indicating that the IOC has received a call for interprocessor communication. As a result, the IOC would via strobe signals from control store 208 transfer the information previously stored in IPCR register 221 to Y register 222. If, for example, the CPU requested status, the IOC decodes this information from the Y register 222 and collects all the information status needed to answer the reason for the call. Since the CPU has made a request from a particular resource, the IOC cannot capture that same resource or use it for any other purpose. Once the IOC has obtained the information requested, it is placed back into the IPCR register 221 which is still synchronized and the IOC generates a strobe signal via control store 208 to control store 105 to indicate that the CPU should take the information in IPCR register 221. This is accomplished by the CPU providing a set IPCR signal which enables the information in IPCR 221 to be transferred to AC register 108 via QMB bus 220.

The IOC can also request information from the CPU and the information exchange using IPCR 221 would occur in essentially the same way. However, control store 208 of the service code unit 202 in IOC 200 would indicate to control store 105 of the CPU 100 that it was requesting the information. Suitable subcommand generation would then follow which would allow the request of the IOC to be examined and answered by the CPU.

QMB bus 220 is used for other purposes such as microdiagnostic and microverification between the CPU and IOC processing units, in addition to the loading of the volative portions of the control store units of the CPU and IOC subsystems. (See, for example, Apparatus and Method for Two Controller Diagnostic and Verification Procedures in a Data Processing Unit by Donald J. Greenwald, Ser. No. 421,649, filed on Dec. 10, 1973, and assigned to the same assignee as the present invention.) Moreover, while information may be processed in each of the individually asynchronous processors, the transfer of information via bus 220 is able to occur simultaneously with data transfers over a peripheral interface bus (not shown). This results since the transfer of control information over bus 220 is a parallel operation. Any conflict of usage of the processing units is resolved by the firmware manipulation between control stores 105 of the CPU and control store 208 of the IOC.

In addition to allowing control exchange between the CPU and IOC subsystems, the IPCU 205 also allows direct communication from the CPU 100 to the peripheral subsystem 50. This feature entails the use of the IPCR register 221 for notification to the peripheral subsystem of significant events which may occur based upon information presently being executed in the CPU subsystem. For example, if a channel program were being executed by the peripheral subsystem and the CPU in the course of processing its information decided that it should terminate the operation of that particular device, the CPU could use the synchronization function described in FIG. 4 in order to capture the IPCR 221 and cause a control signal to be generated to the peripheral subsystem. (For further explanation of other control signals which may be provided from the CPU to the peripheral subsystem, see Microprogrammable Peripheral Processing System by Recks, et al., Ser. No. 425,760, filed Dec. 18, 1973, and Method and Apparatus for Automatic Selection of Translators in a Data Processing System by Douglas L. Riikover, Ser. No. 430,838, filed Jan. 4, 1974, both applications assigned to the present assignee of this invention). The peripheral subsystem 50 would then at some point recognize the control signal being provided by the CPU and would initiate a procedure of calling the IOC to receive the instruction that the CPU desired to send. Thus, an indirect way of having the CPU tell the peripheral subsystem to communicate with the IOC is provided.

The apparatus for providing limited communication to the peripheral subsystem from the CPU is shown by the one of 16 decoder 223 and control signal register 224. The selection of a particular CCU 203, 204, is provided by decoder 223 and the transfer of the information to the selected CCU is provided by register 224. Both decoder 223 and register 224 are enabled by a "Go CCU" signal from the CPU control store 105 via AND-gate 236 and amplifier 240. The output of register 224 selectively raises or lowers certain control lines in the peripheral subsystem without any IOC intervention. These control lines, for example, enable a bistable device in the peripheral subsystem associated with a defined function. Thus, by the transfer of the control signals, communication to the control unit of the peripheral subsystem would occur. Upon the peripheral subsystem recognizing this information, it would modify further operation. The operation for control of the peripheral subsystem by the CPU would be as follows.

The control information contained in the AC register 108 is transferred to IPCR, 221 via QMB bus 220 upon a control signal set IPCR from control store unit 105. Subsequently, control store unit 105 provides a "Go CCU" strobe signal which enables AND-gate 236 and amplifier 240. The signal from 240 enables decoder 223 to select one of the 16 channel control units and logic 224 to transfer the control information to the selected CCU. This control information either raises or lowers a bistable means, for example, a flip flop (not shown). This flip flop is associated with a command signal, such as reset channel described supra. As a result of the change of command, the peripheral subsystem shifts its control and responds to control information directly provided by the CPU subsystem.

It should be noted that IOC to peripheral subsystem communication may also occur. Upon the IOC placing the control information in IPCR 221, a strobe signal is provided by control store 208 to enable AND-gate 238 and amplifier 240. This signal allows not only the particular CCU to be selected by decoder 223, but also the control information in logic 224 is transferred to the selected CCU.

Figure 4A:
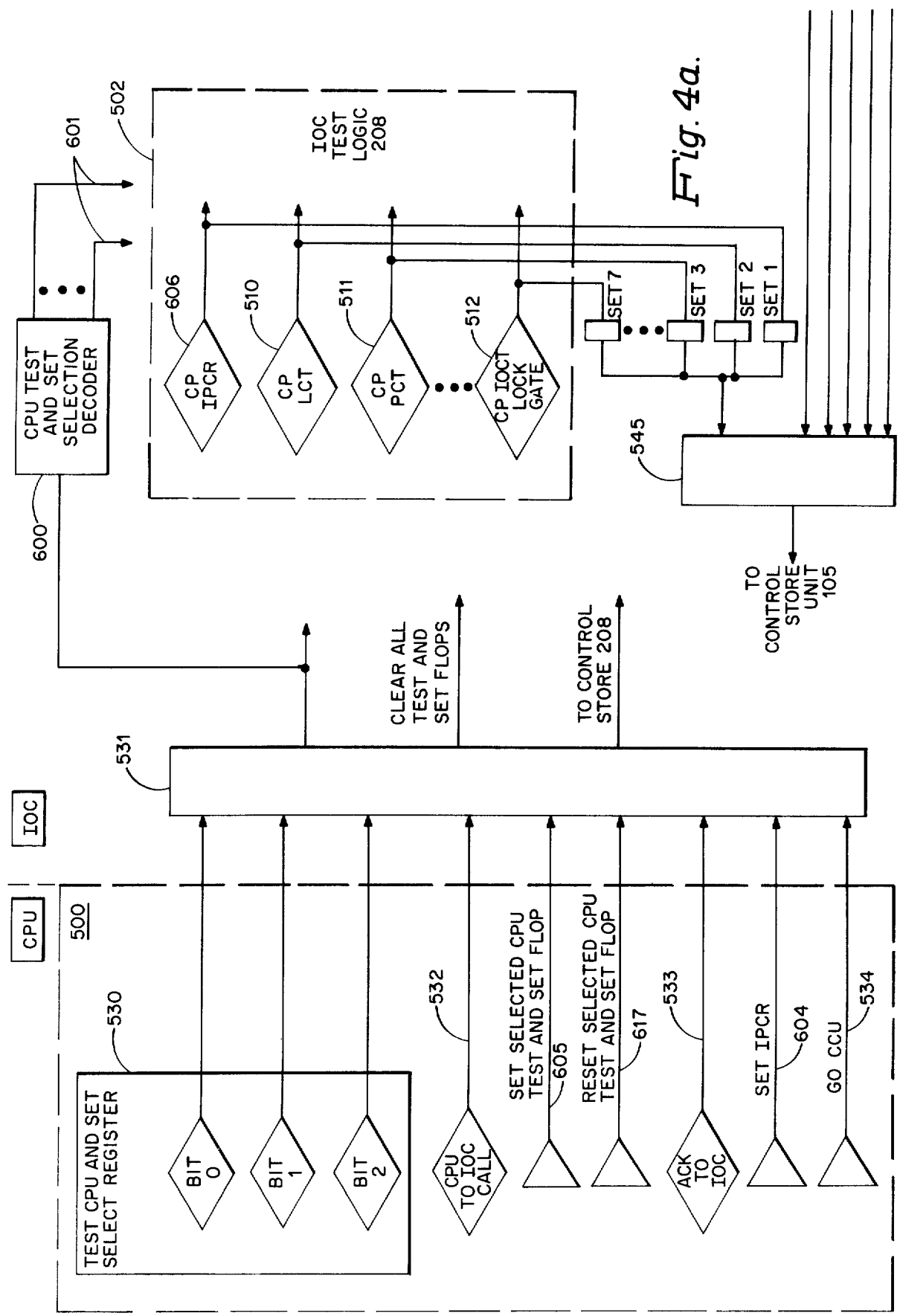
FIG. 4 is a diagram of the interprocessor communications control area and the CPU/IOC control interface.

Referring to FIG. 4, block 500 shows the control signals generated from the CPU 100 via bus 210. These control signals include identification of the shared resource desired by the CPU. Block 501 corresponds to block 500 and shows the control signals generated from the IOC.

Some of the control signals from blocks 500 and 501 select one of eight test and set flip flops (TS flops) shown in blocks 502 and 503 respectively. These TS flops are bistable indicating means for identifying resources in the other processing unit. Each TS flop in block 502 has a corresponding paired TS flop in block 503. Each pair of flip flops represent one shared resource, such as the IPCR 221 described supra.

The TS flop associated with a particular resource does not physically block the particular resource. Rather, it is tested by the processor desiring to utilize the resource, the test indicating the state of the flop. If the test is favorable, i.e., the flop is not set, then the processor may utilize the resource represented by the tested TS flop. It should be noted, however, that if the processor was not changing the contents of the resource, then the processor would probably not even test the particular TS flop.

While the TS flops have been given names, supra, it should further be recognized that they are merely representations of resources which are defined by firmware conventions. Thus, not only are the TS flops able to represent other shared resources but also the convention identifying them can be easily changed thus altering their particular designation.

Figure 5:
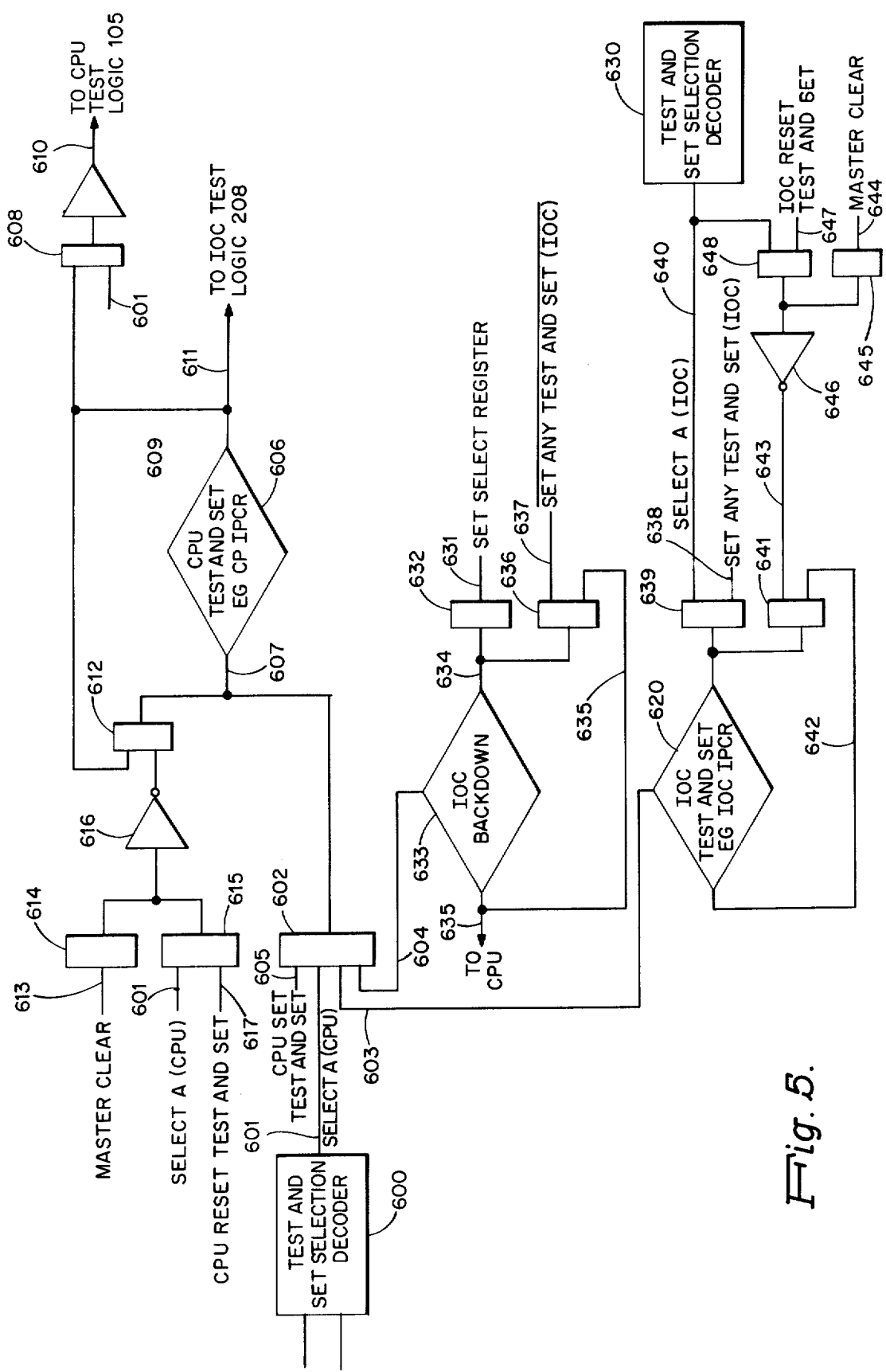
FIG. 5 is a logic diagram showing one of the shared resources and the apparatus necessary for obtaining control either by the CPU processor or the IOC processor over the shared resource.

Before explaining the individual components in FIG. 4, the method of obtaining one of the TS flops within blocks 502 and 503 by blocks 500 and 501 is shown in FIG. 5.

Referring to FIG. 5, a typical implementation for utilizing and accessing one of the eight TS flops is described. It is assumed for explanatory purposes that the CPU desires to set one of the TS flops. It is further assumed that the IOC has not requested control over this shared resource.

Initially, CPU 100 provides a three bit code over bus 210 which identifies, for example, TS flop 606. For purposes of discussion TS flop 606 is associated with the shared resource IPCR 221. This three bit code is transferred from selected register 530 to test and set selection decoder 600 which decodes the three bit combination. As a result, test and set selection decoder 600 provides a positive, i.e., high or true signal only over line 601 to AND-gate 602.

In order for AND-gate 602 to be enabled, all the signals on its input legs must be positive. Since it has been assumed that the IOC has not requested the same resource, line 603 has a positive signal since it is the negation from the paired test and set flip flop corresponding to the IOC identification of the same shared resource. Line 604 would also provide a positive signal because of the assumption that the IOC is not requesting a shared resource. When the IOC requests a shared resource, line 604 carries a negative signal irrespective of the particular shared resource desired.

The CPU 100 then attempts to determine whether or not TS flop 606 had been previously set. In order to do this, AND-gate 608 has as one input the same signal as the one provided over line 601 which selects TS flop 606; and in addition, has a second input signal which identifies the present condition of the flop 606. If the CPU TS flop 606 had been high, AND-gate 608 is enabled and sends via line 610 a signal to the control store 105 of the CPU indicating that the shared resource had already been obtained. If TS flop 606 had not been set, AND-gate 608 would not be enabled, thereby indicating to the CPU that the shared resource was available. Subsequently, the CPU would send a set signal over line 605 which enables AND-gate 602 and sets CPU TS flop 606 via line 607.

Upon being enabled, TS flop 606 generates a positive signal over line 609 enabling AND-gate 608 and providing a positive signal to the CPU over line 610 indicating that the shared resource has been captured. Also, concurrently, over line 611, a positive signal is sent to the IOC indicating that the CPU had assumed control over this shared resource and hence the IOC is aware that it may not control this shared resource.

Thus, the CPU would first test whether bistable means 606 was set and, if it was not set, then on its next execution, the CPU would generate a signal over line 605 which sets it. If the TS flop 606 was incapable of being set, the CPU would enter into a loop wherein it would effectively try to keep setting it.

CPU test and set flop 606 would be reset if AND-gate 612 is disabled. AND-gate 612 has one input from the output of the TS flop 606 via line 609 and a second input from AND-gates 614 and 615. Line 609 provides a positive latchback signal which holds flip flop 606 set. The other input signal to AND-gate 612 is from either AND-gate 614 or AND-gate 615 which input signal is inverted by inverter 616. If a master clear signal is not given, line 613 has a negative signal to AND-gate 614. Inverter 616 provides the negation of this signal, i.e., a positive signal thereby enabling gate 612 and holding TS flop 606 set. Conversely, if the master clear signal is given, AND-gate 614 provides a positive signal to inverter 616 which provides a negative signal to AND-gate 612. AND-gate 612 then resets TS flop 606 which is now not set.

AND-gate 615 is enabled when a reset test and set signal is provided by the CPU over lines 617 and when the particular TS flop 606 has been selected as is shown by line 601. With these two conditions present, TS flop 606 is reset in a similar fashion to the master clear signal. TS flop 606 is a well-known delayed D-flop which is described in Application Rules for P Series Circuits by Pelurso et al., Honeywell Document No. B20028, issued Feb. 12, 1974, and described on pages 1–8 as DKFC1 or DKFC2.

When the IOC wants to obtain control over the IPCR shared resource, it would access test and set (TS) flip flop 620 which corresponds to TS flop 606. Both bistable means 606 and 620 identify the same shared resource, i.e., IPCR 221; when either is set one of the processing units may have control over the particular shared resource. Assuming that the CPU had not set TS flop 606, then the IOC would obtain control of flip flop 620 in the following manner.

IOC 200 provides a three bit address to IOC test and set selection decoder 630. The output of decoder 630 not only identifies TS flop 620 but also provides a signal over line 631 which enables AND-gate 632. As a result, a positive signal is provided from AND-gate 632 to set IOC backdown flip flop 633 over line 634. Once backdown flop 633 is set, a signal over line 635 is sent to the control store unit 105 of CPU 100 indicating that the IOC is attempting to obtain a shared resource. Moreover, once backdown flop 633 is set, the CPU cannot obtain control of any shared resource since the negation output of backdown flop 633 is provided to AND-gate 602.

Since the IOC may provide information from the peripheral devices to the CPU, it is important that the information contained in the IOC be quickly transferred to the CPU. The signal sent over line 635 is tested by control store unit 105 of the CPU. This signal initiates a firmware convention which establishes the priority of IOC to obtain control over the shared resource. If the CPU has control of the resource, the backdown line indicates to the CPU that it should release this resource. If the CPU is concurrently attempting to obtain the same resource, the signal over line 635 acts as a tie breaker and allows the IOC to gain control. Thus, if the CPU requires the resource requested by the IOC for an extended period of time, it will back down and reset its TS flop such that the IOC can assume control over it. If, however, the CPU will finish up its use of the resource within a few steps, then it does not give up its control of resource until it has completed its operation.

From the above, it is apparent that there is a facility for both handling the situation where the resource is not busy and handling it when there is a conflict situation wherein both the CPU and IOC processors desire to obtain control over the same shared resource. In addition, the IOC backdown flop 633 provides for the situation wherein if the IOC requires the use of a shared resource, it provides a signal over line 635 to indicate to the CPU that it should backdown and thereby let the IOC obtain the shared resource to perform its intended operation. Thus, the output of the backdown flop 633 is tested by the CPU to determine whether a potential deadlock situation exists. This would occur when the CPU is calling the IOC at the same time that the IOC is calling the CPU or the CPU is using a shared firmware table for an extended period of time and thus preventing IOC usage of this table.

IOC backdown gate 633 is also coupled to AND-gate 636. When the IOC backdown flip flop is set, it provides a latchback signal over line 635 thereby providing one high signal to AND-gate 636. Concurrently, line 637 has a high signal since at this time, the IOC has not provided any test and set signal for the shared resource, i.e., the fact that the IOC should set flip flop 620. Thus, since both signals are high on lines 635 and 637, AND-gate 636 provides a high signal to IOC backdown flop 633 which holds backdown flop 633 in its set state. Once a signal from the IOC is sent to set the TS flop 620, then AND-gate 636 is disabled and backdown flip flop 633 is reset. The CPU is now able to select any test and set flop which is not selected by the IOC.

At the next clock cycle, the IOC provides for the selection of the test and set flip flop thereby lowering the signal over line 637 and raising the signal on line 638. Line 638 is also connected to AND-gate 639 which has as its second leg and selection of a particular test and set flip flop. In this case, this would be TS flop 620. With the concurrence of the high signals on lines 638 and 640, AND-gate 639 is enabled thereby enabling TS flop 620 to be set.

TS flop 620 has a latchback circuit 642 connected to AND-gate 641. AND-gate 641 is coupled via line 643 to inverter 646 which is connected to AND-gates 648 and 645. The operation of these gates is identical to AND-gates 614, 615 for the CPU. Thus IOC TS flop 620 is reset if the second leg of AND-gate 641, i.e. line 643, has a negative signal. Line 643 has a negative signal when a master clear signal 644 is provided to AND-gate 645 and inverted by inverter 646 or when an IOC reset test and set signal is provided over line 647 to AND-gate 648 and concurrently TS flop 620 has been selected over line 640. Since both these conditions will provide high signals to AND-gate 648, it is enabled thereby providing a high signal to inverter 646 and consequently a low signal over line 643 thereby disabling AND-gate 641 and resulting in IOC TS flop 620 being reset. Thus, it is seen that the input over line 643 breaks the hold provided by the latchback signal over line 642.

If either TS flop 620 or 606 were set, an indication is given to the respective processor that a shared resource had been obtained and as a result, any exchange with that shared resource is inhibited. Thus, a conflict situation is avoided where the processor can access information which may have been previously transformed by the other processor which has control over the same resource. Because of the use of the TS flops 606 and 620, an asynchronous facility for both processors has been provided with each processor able to modify information which both are sharing, and in addition, the ability to keep the other from destroying that particular information.

Referring again to FIG. 4, additional shared resources, as individually indicated by bistable means 606 and 620, are illustrated. These shared resources include control over certain tables located in main memory. These tables include the logical channel tables in the CPU by test and set shared resource 510 which corresponds to IOC test and set shared resource 520. In addition, access to the physical channel tables as controlled by shared resources 511 and 521 and access to an interlock for IO tables and Lock Gate is controlled by shared resources 512 and 522. The latter shared resources provide the interlock for the IO table and any main memory image above the base address register (BAR) requiring synchronization using the IOC channel command test and set and the CPU Lock Gate instruction.

Once a shared resource has been obtained as shown in FIG. 5, only the processor in control of the shared resource has full access thereto. For example, if the resource associated with the logical channel tables of the CPU were controlled by the IOC, then the CPU would not be able to change or modify any information in its own logical channel tables. Upon the shared resource being reset, however, then the processor could use its own tables. As a result of the shared resource control, information in the tables is not modified simultaneously by two asynchronously operating processors. Moreover, the information to be delivered or retrieved from the tables is not destroyed since only one processor may access the table.

In block 500, the test and set select register 530 is shown in addition to certain select and reset signals 605 and 617 respectively which have been previously described. The test and set select register provides the three bit address for identification of a particular shared resource. These signals in addition to selecting a particular test and set flop are also provided to a multiplexor 531 which allows the requesting processor to interrogate the selected test and set flop. The output of the multiplexor 531 is sent to the IOC control store logic 208 for interpretation and command generation responsive to the interpretation.

The control signals provided from blocks 500 and 501 are transferred over bus 210 and provide for the control functions previously indicated. More specifically, the control signals provided from block 500 are, respectively, a call to the IOC over line 532 which indicates that the CPU has some information to send, and an acknowledge signal to the IOC over line 533 which indicates that the CPU is acknowledging the IOC's call. In addition, the control signal over line 534, "Go CCU," which is in FIG. 3 is shown as enabling the information in the IPCR register 221 to be gated into the selected channel as previously described with respect to FIG. 3.

The IOC has the corresponding control signals provided in block 501. Thus, line 540 provides the control signal from control store unit 208 which calls the CPU and requests certain information which the CPU processor has. Line 541 provides the control signal which acknowledges a call from the CPU, i.e., it indicates that the IOC processor has received the information. Line 542 provides a control signal call "confidence" which indicates that the IOC can no longer function. Line 543 corresponds to line 604 in that this provides the control signal to gate the information from the QMB bus into the IPCR register 221. These signals are also provided to a multiplexor 545 which provides the signal over bus 210. Multiplexor 545 is identical to multiplexor 531.

Also within block 501 is an indicator (termination queue occupied) which provides a signal over line 544. Whenever the IOC finished an IO operation or some interrupt was generated, the IOC would build information and place it into an area of memory which the CPU would access. Upon control store 208 generating a strobe signal over line 544, the IOC would inform the CPU that the CPU was able to go and read the particular information placed into memory as may be indicated by the test and set flops 520 to 522. Thus, the termination queue indicates that only after that strobe signal was provided could the CPU access this information.

It has been shown how a shared resource IPCR 221 is controlled by either the CPU or the IOC via test and set flops 606 or 620, and how an interlock situation is avoided. Once control of the shared register has been determined, only that processor is able to use the register for transfer of information. Moreover, other shared resources such as the logical channel tables and physical channels tables of each processor are able to be controlled by the other processor via the test and set flops 510 to 512 and 520 to 522.

It has also been shown how communications between the CPU subsystem and the IOC subsystem can occur through a shared resource IPCR 221 and over a direct bus. Communication of control information between the CPU and the peripheral subsystem is enabled if the CPU obtains control over the shared resource IPCR 221 and provides information to the peripheral subsystem. Thus, the interprocessor communication unit provides a high-speed buffer for CPU/IOC information exchange and/or synchronization, and also provides control over certain peripheral subsystem interface lines to initiate IO instructions and/or processes. Even though the CPU and IOC operate independently of one another, the required synchronization for initiating, terminating and reporting conclusions of various IO processes has been shown via the control signals provided over QMB bus 220. Moreover, an interlock mechanism which prevents catastrophic conflict and deadlock situations from occurring between the IOC and the CPU processors for shared resources has been provided. In case of a conflict with CPU desiring control, a backdown line from the IOC to the CPU processor has been provided which not only enables the IOC to gain control over the shared resource, but also prevents the CPU from gaining access to the shared resource once the IOC has decided to select the shared resource.

While there has been illustrated and described the best mode of the invention known, it will be apparent to those skilled in the art that changes may be made to the apparatus described without departing from the spirit of the invention as set forth in the appended claims, and that, in some cases, certain features of the invention may be used to advantage without a corresponding use of other features.

What is claimed is:

1. In a data processing system having at least two processing units, each processing unit having a plurality of common logical resources which may be utilized by the other processing unit, apparatus for enabling synchronization of the utilization of said common logical resources between said processing units, said apparatus comprising:

a plurality of pairs of bistable indicating means, each of said pairs of said plurality of bistable indicating means corresponding to a one of said resources, one bistable indicating means of each of said pairs corresponding to one processing unit, the other bistable indicating means of each of said pairs corresponding to the other processing unit, first means responsive to said one processing unit for selecting one of said resources and for setting the corresponding one of said plurality bistable indicating means, second means responsive to said other processing unit for selecting one of said resources and for setting the corresponding one of said plurality of bistable indicating means, and third means responsive to said pairs of bistable indicating means for preventing said first means and said second means from setting the corresponding one of said pair of bistable indicating means for said one resource when the other of said pair of bistable indicating means is already set, whereby priority for utilization of said resource is provided.

2. The apparatus as defined in claim 1 wherein said one processing unit is a central processing unit (CPU) and said other processing unit is an input/output controller unit (IOC).

3. The apparatus as defined in claim 1 and further including:

fourth means responsive to said other processing unit for enabling a back-down flip-flop, said back-down flip-flop temporarily inhibiting said one processing unit from setting any of said plurality of bistable indicating means.

4. The apparatus as defined in claim 3 and further including:

fifth means responsive to said one processing unit for resetting said one of said pairs of bistable indicating means, and sixth means responsive to said other processing unit for resetting said other of said pairs of bistable indicating means.

5. In a data processing system having at least two asynchronous processing units exchanging data and utilizing common logical system resources, each of said processing units having its own control store unit for enabling the operations of its processing unit and which may control the operation of the other processing units, apparatus for preventing conflicts in the utilization of said common logical system resources by said asynchronous processing units, said apparatus comprising:

first means responsive to said control store units for selecting one of said common logical system resources for utilization, and second means responsive to said first means for indicating whether one of said asynchronous processing units has priority for utilization of said common logical resources, said second means comprising a plurality of pairs of bistable indicating means, each pair of which is associated with a different one of said common logical system resources and indicates priority for utilization of said one common logical system resource, one bistable indicating means of each of said pairs being associated with one of said asynchronous processing units and the other bistable indicating means of each of said pairs being associated with the other of said asynchronous processing units, only one of said bistable indicating means in each of said pairs being in an indicating state at any one time.

6. An apparatus as defined in claim 5 wherein said first means include:
   decoder means coupled to said control store units for selecting one of said common logical system resources, and
   logical means coupling said decoder means to said bistable indicating means for selectively setting the corresponding one of said bistable indicating means.

7. An apparatus as defined in claim 5 wherein one of said pairs of bistable indicating means is associated with means for interprocessor communication.

8. An apparatus as defined in claim 7 wherein said means for interprocessor communication comprises a register coupled to said control store units for storing signals from either of said control store units, whereby the control store unit associated with said first processing unit may control the operation of said other processing unit and whereby said control store unit associated with said other processing unit may control the operation of the first processing unit.

* * * * *